United States Patent
Wegner et al.

(10) Patent No.: US 10,673,043 B2
(45) Date of Patent: Jun. 2, 2020

(54) SEPARATOR FOR AN ENERGY STORE AND AN ENERGY STORE

(75) Inventors: Marcus Wegner, Leonberg (DE); Jens Grimminger, Leonberg (DE); Martin Tenzer, Unterensingen (DE); Jean Fanous, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 564 days.

(21) Appl. No.: 14/234,018

(22) PCT Filed: May 30, 2012

(86) PCT No.: PCT/EP2012/060094
§ 371 (c)(1),
(2), (4) Date: Apr. 21, 2014

(87) PCT Pub. No.: WO2013/013867
PCT Pub. Date: Jan. 31, 2013

(65) Prior Publication Data
US 2014/0234692 A1 Aug. 21, 2014

(30) Foreign Application Priority Data
Jul. 22, 2011 (DE) .......... 10 2011 079 662

(51) Int. Cl.
| | |
|---|---|
| *H01M 2/16* | (2006.01) |
| *H01M 4/38* | (2006.01) |
| *H01M 10/052* | (2010.01) |
| *H01M 4/58* | (2010.01) |

(52) U.S. Cl.
CPC ......... *H01M 2/166* (2013.01); *H01M 2/1653* (2013.01); *H01M 2/1686* (2013.01); *H01M 4/38* (2013.01); *H01M 4/5815* (2013.01); *H01M 10/052* (2013.01); *Y02T 10/7011* (2013.01)

(58) Field of Classification Search
CPC .. H01M 2/166; H01M 2/1653; H01M 2/1686; H01M 2/1673; H01M 4/38; H01M 4/5815; H01M 10/052; H01M 10/7011
See application file for complete search history.

(56) References Cited

U.S. PATENT DOCUMENTS

| | | | | |
|---|---|---|---|---|
| 4,123,596 | A * | 10/1978 | Robinson | H01M 4/66 429/104 |
| 4,650,730 | A * | 3/1987 | Lundquist | H01M 2/1653 429/145 |
| 5,853,916 | A * | 12/1998 | Venugopal | H01M 2/1686 429/303 |
| 6,183,901 | B1 * | 2/2001 | Ying | H01M 2/16 429/129 |
| 6,225,002 | B1 * | 5/2001 | Nimon | H01M 10/0569 29/623.5 |
| 6,376,123 | B1 * | 4/2002 | Chu | H01M 4/02 429/104 |
| 7,282,296 | B2 | 10/2007 | Visco et al. | |
| 2001/0034934 | A1 | 11/2001 | Xu et al. | |
| 2005/0175903 | A1 | 8/2005 | Kim et al. | |
| 2005/0191558 | A1 * | 9/2005 | Sannier | H01M 2/1653 429/303 |
| 2009/0075176 | A1 * | 3/2009 | Singh | H01B 1/122 429/309 |

FOREIGN PATENT DOCUMENTS

| | | |
|---|---|---|
| CN | 1389948 A | 1/2003 |
| JP | 2002-532852 | 10/2002 |
| JP | 2002-532854 | 10/2002 |
| JP | 2005-79096 | 3/2005 |
| JP | 2005-530323 | 10/2005 |
| WO | 2003/012896 | 2/2003 |

OTHER PUBLICATIONS

Ka-ga-ku da-i-ji-te-n, (Chemical Dictionary 8), miniature edition, 1964, Kyoritsu Shuppan Publishing Office, pp. 757-758 with English translation.

* cited by examiner

*Primary Examiner* — Robert S Jones
*Assistant Examiner* — Claire L Roe
(74) *Attorney, Agent, or Firm* — Norton Rose Fulbright US LLP; Gerard Messina

(57) ABSTRACT

A separator for an energy store. The separator may be used in a lithium-sulfur battery in particular. To achieve improved cycle stability, the separator has at least one first layer and at least one second layer, the at least one first layer containing a material having an affine property with respect to at least one active electrode material, and the at least one second layer containing a material having a repellent property with respect to at least one active electrode material. The at least one first layer and the at least one second layer may be situated directly adjacent to one another. Also described is an energy store including the separator.

17 Claims, 1 Drawing Sheet

SEPARATOR FOR AN ENERGY STORE AND AN ENERGY STORE

FIELD OF THE INVENTION

The present invention relates to a separator for an energy store. The present invention relates in particular to a separator for a lithium-sulfur battery having improved cycle stability, and a lithium-sulfur battery including the separator.

BACKGROUND INFORMATION

Secondary batteries have a high potential for a variety of fields of application. For example, secondary batteries based on the lithium-sulfur redox pair may be used, in particular based on the high specific capacity of sulfur. For a number of applications, however, there may still be potential for improvement, in particular of the cycle stability of such energy stores.

It is thus known that lithium-sulfur batteries, for example, have a so-called shuttle mechanism under some circumstances. This mechanism is based essentially on differences in solubility of the resulting lithium-sulfur species. The overall reaction $Li+S_8 \leftrightarrow Li_2S$ taking place in such batteries specifically includes multiple polysulfide intermediates having a sulfur chain length between three and eight. These are readily soluble in conventional electrolyte systems. However, the $Li_2S_2$ and $Li_2S$ reaction products are almost insoluble in many solvents and electrolyte systems.

Based on the difference in solubility of the polysulfides, long-chain polysulfides diffuse to the metallic lithium anode, where they react directly with lithium and are reduced. The resulting medium-chain and short-chain polysulfides may in turn diffuse to the cathode, where they are oxidized to longer-chain polysulfides or may enter into a comproportionation reaction with any present sulfur species of a higher sulfur oxidation level. Insoluble sulfide species, which may precipitate at the anode, may be formed during reaction with lithium at the anode. A fast polysulfide shuttle may also complicate or prevent complete recharging of the cell.

U.S. Pat. No. 7,282,296 B1 discusses separators and electrode structures for protecting active metal anodes from harmful reactions with air, moisture or other battery components in particular. The separator should have a high degree of ionic conductivity to simplify its manufacture and to improve the efficiency of the battery. The separator has two layers of differing chemical compatibility. The first layer is in direct contact with the anode and is chemically compatible with the anode. It therefore does not form with another component of the battery, the surroundings or the anode itself a compound that would be harmful for the battery. The second layer is essentially impermeable for additional components of the battery, for instance the electrolyte and the surroundings, and thus prevents contact between the battery and these components. The second layer is chemically compatible with the first layer.

SUMMARY OF THE INVENTION

The subject matter of the present invention is a separator for an energy store, in particular for a lithium-sulfur battery, which includes at least one first layer and at least one second layer, the at least one first layer containing a material which has an affine property with respect to at least one active electrode material, and the at least one second layer containing a material which has a repellant property with respect to one active electrode material, the at least one first layer and the at least one second layer being situated directly adjacent to one another in particular.

A separator in the sense of the present invention may be in particular an arrangement for separating an anode and a cathode in an energy store. The separator may in particular prevent active material from inadvertently getting from the anode to the cathode and above all from the cathode to the anode. In addition, the separator may be used to electrically separate the anode and the cathode from one another.

An active material may also be in particular a material which imparts its actual functionality to an energy store or is needed for the function of an energy store. The active material may be in a charged state of the energy store, for instance, and may be dissociated by electrochemical processes during the discharging process. Alternatively, the active material may be formed during a discharging process, so that it may be present in a discharged state of the energy store. Furthermore, an active material in the sense of the present invention may be understood to be a material as an intermediate formed from a material in the anode and/or cathode during charging and/or discharging. For the case of a lithium-sulfur battery, for example, the active material may be understood to be various lithium-sulfide species or polysulfide species, merely as an example, without restricting the scope in any way.

The separator has at least one first layer and at least one second layer according to the present invention. A layer in the sense of the present invention may be understood in particular to refer to any suitable layer. The separator may have at least one first layer and at least one second layer, i.e., a total of at least two layers, or it may have a plurality of layers.

According to the present invention, the first layer includes or is made of a material which has an affine property with respect to at least one active electrode material. In the sense of the present invention, this may mean in particular that the first layer has attractive forces with respect to the at least one active material. Affine properties may include, in particular, the tendency to enter into a bond, for example, sterically, covalently or electrostatically. Consequently, each state may include in particular a slight attractive force to a covalent bond. In this way, the active material may be immobilized in the first layer. The second layer also includes or is made of such a material having a repellant property with respect to one active electrode material. A repellant property may be understood in the sense of the present invention to mean in particular that there is no affinity but instead there are repulsive forces, for example. This may also be implemented by electrostatic forces, for example. In addition, repellant properties in the sense of the present invention also include impermeability for the active material. This may be accomplished by providing a second layer, for example, which does not have any pores or through-channels or the like, through which the active material is able to pass. Consequently, the second layer may not be permeable for the active material. The second layer may thus form a barrier, such as a diffusion barrier for the active material.

The at least one first layer and the at least one second layer may be situated directly next to one another. In the sense of the present invention, this may mean in particular that the at least two layers are provided without the provision of an intermediate layer, i.e., they are directly adjacent to one another.

It is possible with the separator according to the present invention to considerably reduce or even completely prevent active material from migrating unintentionally from the cathode to the anode or vice versa. Therefore, in the case of a lithium-sulfur battery, for example, the shuttle mechanism in particular may be effectively counteracted.

Therefore, the effectiveness of a charging and/or discharging process may be made more effective, and furthermore, the loss of active material due to insoluble deposits may be reduced or completely prevented. In addition, complete oxidation of polysulfides to elemental sulfur may be ensured in the case of a lithium-sulfur battery, for example, resulting in an improved capacitance.

A retentive effect may be achieved in a particularly effective manner with the multilayer design of a total of at least two layers according to the present invention. For example, migration of the active material may be reduced significantly or even prevented entirely by the second layer. For the case when active material penetrates into the second layer despite the design of the second layer with a repellant property with respect to the active material, this active material is attracted by the first layer and remains there. Migration to the counterelectrode may be further reduced in this way, even if active material penetrates through the second layer. Alternatively, the active material in the first layer may initially be immobilized, thereby further impeding passage through the second layer. Consequently, the retention of active material may be further reduced in comparison with the approaches known from the related art.

In addition, the separator may also remain stable for an almost unlimited cycle time. The retention of active material may therefore remain stable over a large number of cycles, which would lengthen the long-term stability of the separator per se and would also lengthen that of an energy store equipped with the separator.

In addition, with respect to the shape and design of the individual layers, a separator according to the present invention may be manufactured in almost unlimited embodiments so that the separator according to the present invention is adaptable or usable for a plurality of fields of application. Therefore, an energy store equipped with the separator according to the present invention also has a plurality of fields of application.

It is possible to choose freely the orientation in which the layers are situated. However, the second layer may be oriented toward the electrode whose active material is to be retained. Thus, for example, the second layer in a lithium-sulfur battery may be oriented in the direction of the cathode, whereas the first layer may be oriented in the direction of the anode. In this case, the active material is held in the spatial surroundings of the cathode, which makes it possible to further improve the capacitance.

Within the scope of one embodiment, the separator may have a number of 3+2n layers, the 3+2n layers being situated in alternation with respect to the first and second layers. On the whole, the separator according to the present invention may thus expand to more than two layers in a particularly advantageous manner. In the sense of the present invention, in addition to providing two layers, i.e., a first layer and a second layer in this embodiment, three or more layers in particular may be provided. This may be implemented in a particularly advantageous manner by always expanding the layer configuration by a first layer having affine properties with respect to the active material and a second layer having repellant properties with respect to the active material. Consequently, there are always 3+2n layers, where n may be zero or any integer (n=0, 1, 2, 3 . . . ). Since in this embodiment an odd number of layers is always provided, it is also possible for there to be one more second layer than there are first layers. In this embodiment, a plurality of layers may be provided, which always form an effective barrier for the active material or attracting the active material. It is therefore possible to prevent active material from migrating from one electrode to the counterelectrode in a particularly effective manner.

In addition, in this embodiment in particular, it is possible to provide three or more layers to achieve the result that in one embodiment, a first layer may be situated between two second layers. In this embodiment, an effective enclosure or a cage for the active material in which the active material is immobilized may be created. Specifically, the active material is attracted or bonded not only by an affine layer with respect to the active material, but it is also possible to prevent active material from escaping from the first layer thanks to the two second layers bordering the first layer. Consequently, unintentional migration of active material from the cathode to the anode, for instance, is prevented even more effectively in this embodiment. Such an embodiment is possible when providing only three layers as well as when providing a plurality of first layers or second layers. In this embodiment, when there are more than three layers in particular, passage of active material may be prevented in a particularly effective manner by the fact that a plurality of enclosures for the active material is formed. Even if active material penetrates through an enclosure in this way, it is always possible to immobilize it securely in a neighboring enclosure. This embodiment is fundamentally conceivable with any suitable layer combination or layer configuration. In addition, only one first layer or any number of first layers may be situated between two second layers.

Within the scope of another embodiment, the separator may have a conductive additive situated in particular in the at least one first layer. By providing a conductive additive, it is possible to counteract a loss of capacitance due to active material collecting in the first layer. Specifically, active material, which is immobilized or positioned in the first layer in particular, is basically no longer available initially as an active electrode component for a function of an energy store. Since, for example, active material does not reach the anode, but also for the case when it cannot migrate to the cathode on its own, this condition might under some circumstances cause a loss of active material and thus possibly a loss of capacitance of an energy store equipped with the separator according to the present invention. This effect may be prevented effectively in this embodiment. Electrical contacting of the separator layers and thus of the active material may thus be achieved.

A conductive additive may be in particular an electrically conductive material such as graphite or carbon black in the sense of the present invention. This may be situated in the at least one first layer because here in particular an increased concentration of active material is to be expected. However, the conductive additive may also be beneficial in the at least one second layer to enable contacting. This contacting allows electrochemical oxidation and reduction of the active material immobilized in the layer structure. The capacitance of an energy store therefore remains stable. However, the conductive additive need not be situated in all layers since otherwise under some circumstances an electrical connection between the anode and the cathode could result in a short circuit. At least one layer may be configured without a conductive additive. It may be the case here if the layer which may be oriented toward an anode, i.e., in particular an end layer, does not have any conductive additive. In this case, the active material may still interact with the cathode with no problem.

It may be that if the conductive additive is present in a quantity of ≤20%. In this quantity, adequate electrochemical binding of the layer structure or of the active material positioned in the layer structure may be achieved. However, the affine properties or the repellant properties with respect to the active material may then be essentially retained.

Within the scope of another embodiment, the at least one first layer may have a thickness in a range of ≥1 µm to ≤100 µm, for example, ≥10 µm to ≤50 µm, and/or the at least one second layer may have a thickness in a range of ≥1 µm to ≤100 µm, for example, ≥10 µm to ≤50 µm. Such thicknesses are adequate for creating an effective barrier or an adequately dimensioned receptacle area. In addition, there is a great compactness of the separator, so that the separator according to the present invention may be used in this embodiment in particular for a plurality of compact fields of application.

Within the scope of another embodiment, the at least one first layer may include a polymer having at least one heteroatom or it may be made up of this and/or the second layer may include a polymer functionalized with anionic and/or negatively polarized groups or may be made of same. With respect to the material for the first layer, polymers having at least one heteroatom incorporated into the molecular structure as an individual atom are suitable in particular since they have a particularly strong affinity for polysulfides, for example. These materials are therefore advantageous in particular for use in lithium-sulfur batteries. The heteroatoms may be freely selectable. Nonrestrictive examples include oxygen or sulfur. An exemplary polymer for the first layer contains polyethylene oxide, for example, or a derivative thereof. A derivative here may mean in particular a material based on polyethylene oxide or a material containing polyethylene oxide. With respect to the material for the second layer, polymers functionalized with anionic and/or negatively polarized groups may be used. Such polymers may in particular have anionic groups or negatively charged groups whose negative charge is localized over a large range of the molecule. Consequently, these may be in particular polymers having a conjugated negative charge or polarization. Such polymers may achieve a sufficiently high lithium ion conductivity through only a minor interaction with the lithium ions. In addition, such polymers offer electrostatic repulsive forces to the corresponding sulfide species due to the delocalized negative charge or negative polarization in particular, thus creating a barrier effect without any negative influence on the lithium ion transport. Examples of anionically functionalized polymers include polystyrene or derivatives thereof such as polystyrene sulfonates, 4-halopolystyrenes, in which the halogen may be bromine, iodine or chlorine, 4-nitropolystyrene, 4-hydroxy-polystyrene, 2,6-dihydroxy-4-nitropolystyrene or suitable combinations thereof.

Within the scope of another embodiment, the at least one first layer and/or the at least one second layer may be porous to accommodate a liquid electrolyte in particular. A suitable electrolyte system contains 1,3-dioxylane (DOL) and dimethoxyethane (DME) in lithium bis(trifluoromethyl-sulfonyl) imide (LiTFSI), for example. In this embodiment, the separator may thus accommodate a suitable electrolyte, so that a good ionic conductivity is achievable. It is not necessary to take the ionic conductivity properties into account in the choice of the materials of the first or second layer. The choice of the appropriate materials may instead be directed at the interaction with the active material. In this embodiment, the separator may thus be particularly effective. Suitable porosities may therefore be in a range of ≥20% to ≤90%, in particular from ≥30% to ≤70%.

The subject matter of the present invention is also an energy store, in particular a lithium-sulfur battery including at least one separator according to the present invention. An energy store according to the present invention has the advantages described with respect to the separator in particular. Specifically an energy store according to the present invention has, in particular, an improved cycle behavior and an improved long life.

Additional advantages and advantageous embodiments of the subject matters according to the present invention are illustrated by the drawings and explained in the following description. It should be noted that the drawings have only a descriptive character and are not intended to restrict the present invention in any form.

DETAILED DESCRIPTION

Figure 1:
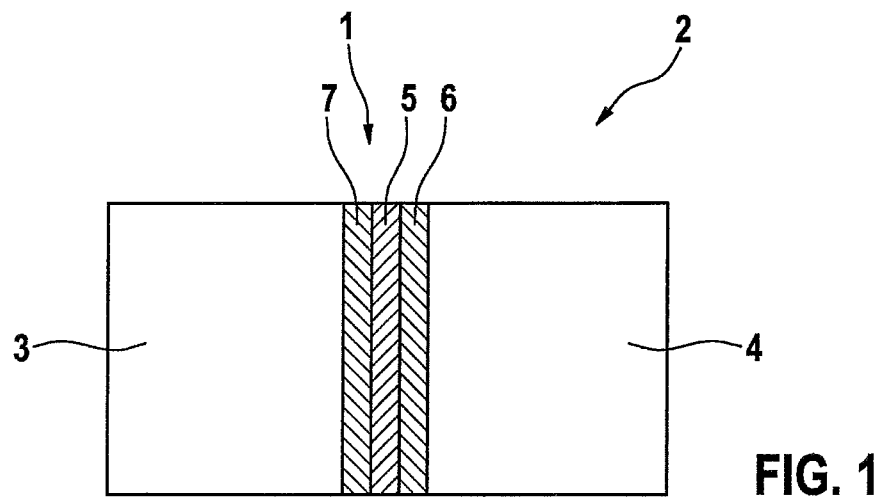
FIG. 1 shows a schematic diagram of one specific embodiment of a separator according to the present invention situated in an energy store according to the present invention.

FIG. 1 shows one specific embodiment of a separator 1 according to the present invention. Separator 1 may be situated in an energy store 2 in particular. Energy store 2 may be a lithium-ion battery, for example. It may be used in electric tools, computers, hybrid vehicles, purely electrically operated vehicles or other types of mobile or stationary applications, in which energy stores 2 having a high specific energy are advantageous in particular.

Energy store 2 may have an anode 3 and a cathode 4. Anode 3 and cathode 4 are configured as a function of the type of energy store 2 in particular and may include a suitable active material. For the case of a lithium-sulfur battery, for example, the anode may be made of metallic lithium, for example. Cathode 4 may also form a cathode matrix, typically containing sulfur, a conductive additive such as graphite, carbon black, carbon nanotubes, carbon nanofibers or other electrically conductive carbon species as well as a binder, for example, polyvinylidene fluoride (PVDF), cellulose-based binders or Teflon. A conductive additive may be advantageous since neither elemental sulfur nor lithium sulfide or lithium disulfide is electrically conductive. Cathode 4 in particular has polysulfides as the active material for the case of the lithium-sulfur cell, depending on the charge state of energy store 2.

Separator 1 has at least one first layer 5 and at least one second layer 6, 7 to prevent migration of active material from cathode 4 to anode 3, for example. According to FIG. 1, two second layers 6, 7 are provided. The at least one first layer 5 contains a material having an affine property with respect to at least one active electrode material, for instance one or a plurality of polysulfides. On the other hand, the at least one second layer 6, 7 contains a material having a repellent property with respect to one active electrode material, for instance one or a plurality of polysulfides. It is apparent in FIG. 1 that the at least one first layer 5 and the at least one second layer 6, 7 may be situated directly adjacent to one another. In addition, according to FIG. 1, the at least one first layer 5 is situated between two second layers 6, 7.

The at least one first layer 5 may have a thickness in a range of ≥1 μm to ≤100 μm, for example, ≥10 μm to ≤50 μm. Alternatively or additionally, the at least one second layer 6, 7 may have a thickness in a range of ≥1 μm to ≤100 μm, for example, ≥10 μm to ≤50 μm. The desired retention behavior of separator 1 is therefore particularly effective and it has good compactness.

Furthermore, the at least one first layer 5 may include a polymer having at least one heteroatom and/or the at least one second layer 6, 7 may include a polymer functionalized with anionic groups and/or negatively polarized groups. Examples may include in a nonrestrictive manner polyethylene oxide or a derivative thereof for the at least one first layer 5 and polystyrene or a derivative thereof for the at least one second layer 6, 7.

To provide a good ionic conductivity through separator 1, regardless of the choice of material for corresponding layers 5, 6, 7, and thus to permit an efficient function of energy store 2, the at least one first layer 5 and/or the at least one second layer 6, 7 may be porous to accommodate a liquid electrolyte in particular. The entire separator may be porous or only a defined electrolyte region may be porous.

Figure 2:
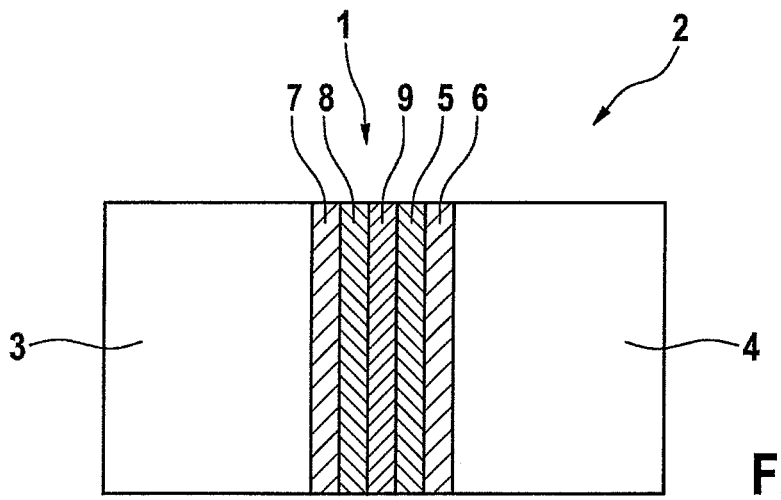
FIG. 2 shows a schematic diagram of another specific embodiment of a separator according to the present invention situated in an energy store according to the present invention.

FIG. 2 shows another specific embodiment of separator 1 according to the present invention and energy store 2 according to the present invention. Separator 1 and energy store 2 correspond essentially to those described in FIG. 1, so that the same or corresponding components are labeled with the same reference numerals. Furthermore, the features of separator 1 and energy store 2 described in FIG. 1 are possible in the same way for separator 1 and energy store 2 according to FIG. 2.

In the specific embodiment according to FIG. 2, separator 1 includes a total of five layers. Two first layers 5 and 8 and three second layers 6, 7 and 9 are provided. As also shown in the specific embodiment according to FIG. 1, separator 1 in the specific embodiment according to FIG. 2 has a number of 3+2n layers, the 3+2n layers being situated in alternation with respect to the first layers 5, 8 and the second layers 6, 7, 9.

Figure 3:
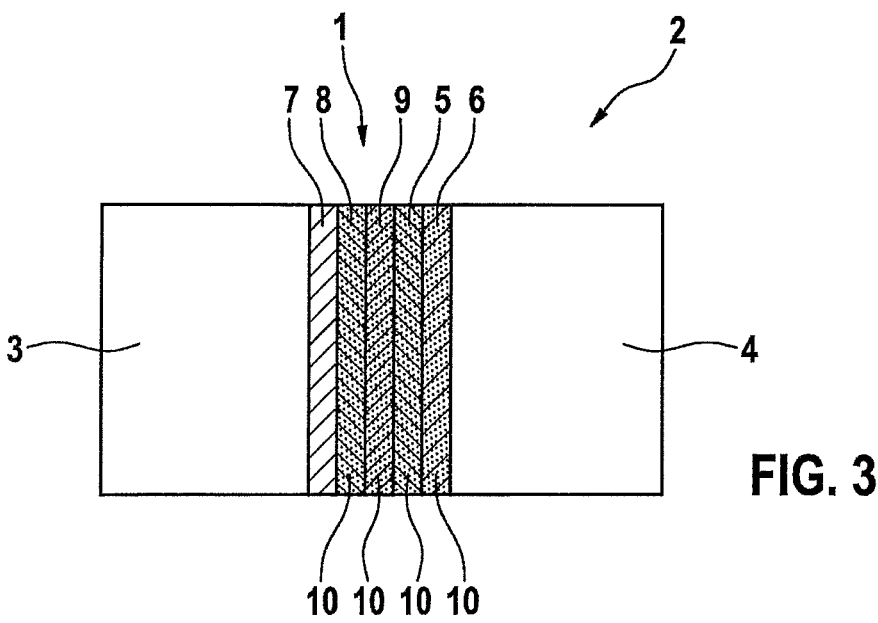
FIG. 3 shows a schematic diagram of another specific embodiment of a separator according to the present invention situated in an energy store according to the present invention.

FIG. 3 shows another specific embodiment of separator 1 according to the present invention and energy store 2 according to the present invention. Separator 1 and energy store 2 correspond essentially to those described in FIGS. 1 and 2, so that the same or corresponding components are labeled with the same reference numerals. Furthermore, the features of separator 1 and energy store 2 described in FIG. 1 are possible in the same way for separator 1 and energy store 2 according to FIG. 3.

According to FIG. 3, separator 1 has a conductive additive 10. Conductive additive 10 may be situated only in the at least one first layer 5 or in multiple first layers 5, 8, for example. Furthermore, the conductive additive may be situated in any layer. However, it is advantageous if the conductive additive is not provided in layer 7 facing anode 3.

The conductive additive may be graphite or carbon black, for example, or may be made up of the aforementioned materials. Furthermore, conductive additive 10 may be present in a quantity in a range of ≤20%.

What is claimed is:

1. A lithium-sulfur battery comprising:
a cathode including an active electrode material;
an anode;
at least one separator, including:
at least one first layer; and
at least one second layer;
wherein:
each of the at least one first layer contains a material due to which the each of the at least one first layer is affine with respect to, and thereby attracts and does not repel bonding with, the active electrode material of the cathode;
each of the at least one second layer contains a material due to which the each of the at least one second layer is repellant with respect to, and therefore repels and does not attract bonding with, the active electrode material of the cathode;
the at least one first layer and the at least one second layer are situated directly adjacent to one another;
of all of the layers of the separator, one of the at least one second layer is nearest to the cathode;
the at least one first layer contains a conductive additive;
at least one of the at least one second layer does not contain any of the conductive additive;
the at least one second layer contains a polymer functionalized with anionic groups, the polymer being polystyrene or a derivative thereof; and
the at least one first layer contains a polymer having at least one heteroatom.

2. The energy store of claim 1, wherein the separator has a number of 3+2n layers, and the 3+2n layers are situated in alternation with respect to the first layer and the second layer.

3. The energy store of claim 1, wherein each of the at least one first layer is situated between a respective pair of the second layers.

4. The energy store of claim 1, wherein the conductive additive is graphite or carbon black.

5. The energy store of claim 1, wherein the at least one first layer has a thickness in a range of >1 μm to <100 μm.

6. The energy store of claim 1, wherein the polymer of the at least one first layer is polyethylene oxide or a derivative thereof.

7. The energy store of claim 1, wherein the at least one first layer is porous to accommodate a liquid electrolyte.

8. The energy store of claim 1, wherein the at least one first layer has a thickness in a range of >10 μm to <50 μm or the at least one second layer has a thickness in a range of >10 μm to <50 μm.

9. The energy store of claim 1, wherein the at least one second layer has a thickness in a range of >1 μm to <100 μm.

10. The energy store of claim 1, wherein the at least one second layer is porous to accommodate a liquid electrolyte.

11. The energy store of claim 1, wherein the at least one second layer has a thickness in a range of >10 μm to <50 μm.

12. A lithium-sulfur battery comprising:
a cathode including an active electrode material;
an anode; and
a separator that includes a first layer and second layers between which the first layer is arranged;
wherein:
the first layer of the separator consists of material due to which the first layer is affine with respect to, and thereby attracts and does not repel bonding with, the active electrode material of the cathode;
each of the second layers consists of material due to which the each of the second layers is repellant to, and therefore repels and does not attract bonding with, the active electrode material of the cathode;

the first layer and the second layers are situated directly adjacent to each other;

of all of the layers of the separator, one of the at least one second layers is nearest to the cathode;

each of at least one of the second layers contains a polymer functionalized with anionic groups, the polymer being polystyrene or a derivative thereof; and the first layer contains a polymer having at least one heteroatom.

13. The energy store of claim 1, wherein the at least one of the at least one second layer is immediately adjacent the anode.

14. The energy store of claim 1, wherein:

the at least one second layer includes at least two second layers;

each of the at least one first layer is surrounded by a respective pair of the at least two second layers; and one of the second layers is nearest, of all of the layers of the separator, to the anode and is the only one of the layers of the separator that does not contain any of the conductive additive.

15. The energy store of claim 1, wherein:

the at least one first layer contains polyethylene oxide or a derivative thereof; and the active electrode material is a polysulfide.

16. The energy store of claim 1, wherein one of the at least one second layer is immediately adjacent to the anode, and none of the at least one first layer is immediately adjacent to the anode.

17. The energy store of claim 1, wherein the one of the at least one second layer is immediately adjacent to the cathode.

* * * * *